United States Patent [19]
Kneip et al.

[11] Patent Number: 5,261,692
[45] Date of Patent: Nov. 16, 1993

[54] INFLATABLE RESTRAINING DEVICE FOR MOTOR VEHICLE OCCUPANTS

[75] Inventors: Rainer Kneip, Eberdingen-Hochdorf; Norbert Schwan, Leonberg; Herbert Boegge, Wiemsheim, all of Fed. Rep. of Germany

[73] Assignee: Dr. Ing. h.c.e. Porsche AG, Fed. Rep. of Germany

[21] Appl. No.: 962,632

[22] Filed: Oct. 16, 1992

[30] Foreign Application Priority Data

Oct. 19, 1991 [DE] Fed. Rep. of Germany ..... 41346734

[51] Int. Cl.$^5$ ...................... B60R 21/16; B60R 21/20
[52] U.S. Cl. ................................... 280/728; 280/743
[58] Field of Search ........... 280/728 R, 728 A, 730 R, 280/730 A, 732, 743 R, 743 A

[56] References Cited

U.S. PATENT DOCUMENTS

| | | | |
|---|---|---|---|
| 3,514,125 | 5/1970 | Nemecek | 280/150 |
| 4,191,392 | 3/1980 | Barnett | 280/740 |
| 4,332,398 | 1/1982 | Smith | 280/732 |
| 5,094,475 | 3/1992 | Olsson et al. | 280/732 X |
| 5,149,130 | 9/1992 | Wooley et al. | 280/743 R |

FOREIGN PATENT DOCUMENTS

| | | | |
|---|---|---|---|
| 0404302 | 12/1990 | European Pat. Off. | 280/728 A |
| 0422840 | 4/1991 | European Pat. Off. | 280/728 |
| 2043255 | 3/1971 | Fed. Rep. of Germany . | |
| 3939311 | 5/1990 | Fed. Rep. of Germany . | |
| 2167652 | 8/1973 | France . | |
| 0070648 | 3/1991 | Japan | 280/728 A |
| 4201755 | 7/1992 | Japan | 280/728 |
| 1531069 | 12/1975 | United Kingdom . | |

Primary Examiner—Margaret A. Focarino
Assistant Examiner—Peter English
Attorney, Agent, or Firm—Evenson, McKeown, Edwards & Lenahan

[57] ABSTRACT

A restraining device for motor vehicle occupants has an inflation device, a housing, and an inflatable airbag connected with the housing. In order to provide a simple and inexpensive airbag attachment to the housing with a functionally correct grip, provision is made for the airbag to abut the outside of the housing by at least one suspender-like section.

12 Claims, 3 Drawing Sheets

INFLATABLE RESTRAINING DEVICE FOR MOTOR VEHICLE OCCUPANTS

BACKGROUND OF THE INVENTION

The invention relates to a restraining device for motor vehicle occupants, this device having of an inflation device, a housing, and an inflatable airbag connected to the housing.

In a known restraining device for motor vehicle occupants, such as that disclosed in German Patent No. 39 39 311 A1, an airbag is clamped to a housing section by an annular fastening part with a plurality of fastening elements being provided and distributed over the circumference of the fastening part. This arrangement suffers from the disadvantage that a plurality of fastening elements is required to fasten the airbag and that therefore the assembly of the airbag is relatively time-consuming and expensive.

An object of the present invention is to provide an airbag fastening for a housing offering a functionally correct grip wherein the necessary components, assembly time, and manufacturing costs can be reduced.

This and other objects are achieved according to the invention by having the airbag abut the outside of a housing by means of at least one suspender-like section. The suspender-like section can be guided around opposite side walls and a bottom of the housing and can be made integral with the airbag. In an embodiment of the invention, the suspender-like section extends over at least a partial area of the width of the housing and is slidable over the housing from the side. In certain embodiments, the airbag has a recess that facilitates lateral assembly on at least one lateral external end area of the suspender-like section. The airbag can be connected with the housing in an upper area of the suspender-like section in a gas-tight manner by a tensioning element, which can be formed by a compressible locking tensioning strip surrounding the housing like a ring. In certain embodiments, the tensioning element is held in place by outwardly directed bead-like elements in the upper edge area of the housing.

Advantages offered by the invention include the fact that the suspender-like section provided on the airbag produces a simple inexpensive fastening of the airbag to the housing. The positive grip of the side walls and bottom of the housing produces a secure hold between the airbag and the housing, with the forces that develop being distributed over a large area of the housing. Only a few components and no fastening elements such as screws or the like are necessary to fasten the airbag to the housing, thereby considerably reducing assembly time and cost.

A connection between the housing and the airbag is provided adjacent to the escape opening, with the tensioning element producing a functionally correct seal between the housing and the airbag.

A recess in the suspender-like section, located laterally outside, permits simple mounting of the airbag (lateral sliding on). The elements on the housing and airbag, provided above and below the tensioning element and projecting outward, prevent the tensioning element from being displaced heightwise.

Other objects, advantages and novel features of the present invention will become apparent from the following detailed description of the invention when considered in conjunction with the accompanying drawings.

DETAILED DESCRIPTION OF THE DRAWINGS

Figure 1:
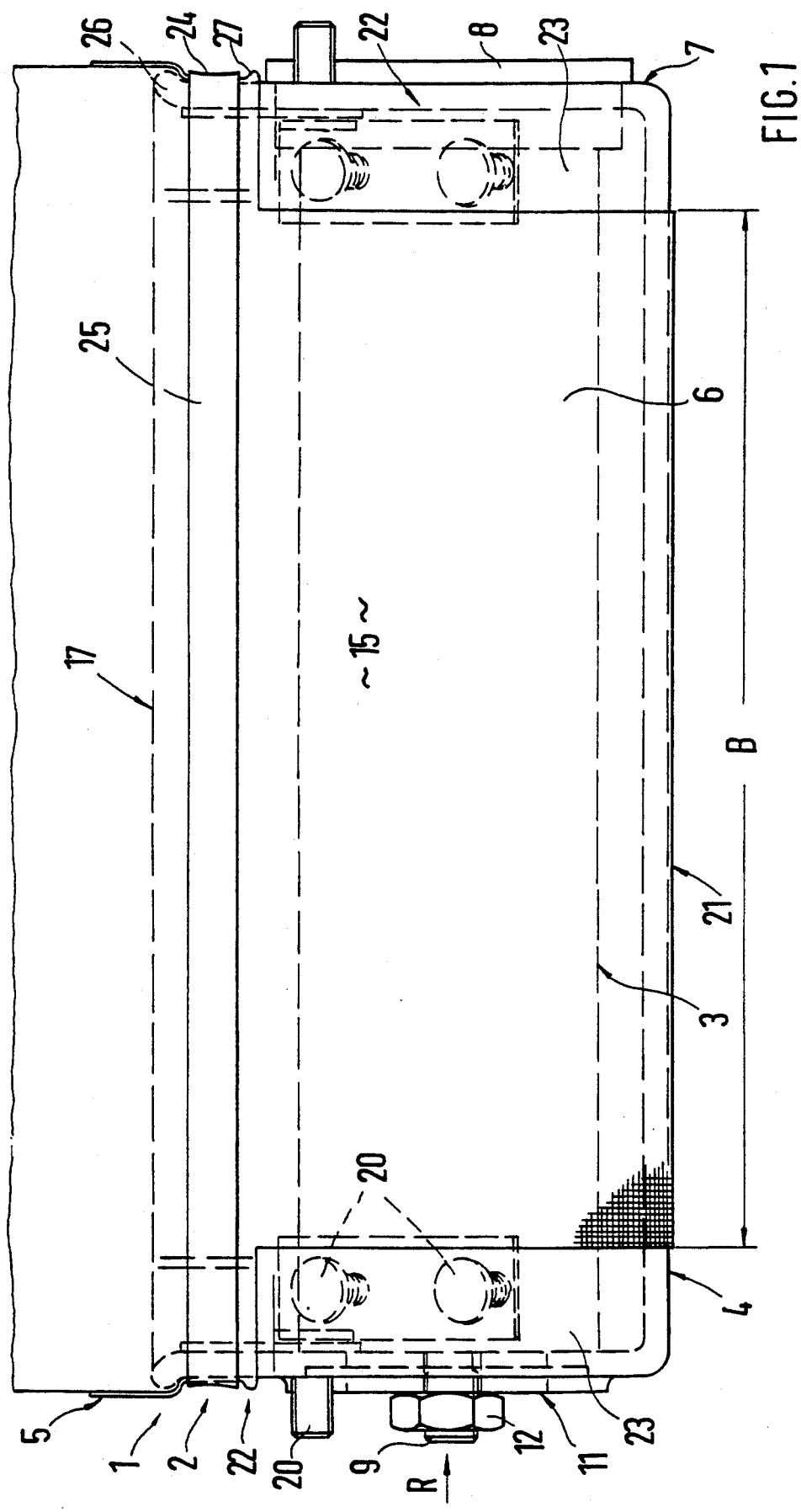
FIG. 1 is a passenger airbag module according to an exemplary embodiment of the present invention, viewed from the front.

Referring to FIG. 1, a restraining device I for a motor vehicle occupant comprises a passenger airbag module 2 placed in an opening (not shown) in an instrument panel and held in place in a car body (not shown). The opening is sealed by a cover (not shown) connected in suitable fashion with the passenger airbag module and/or instrument panel.

The passenger airbag module 2 comprises an inflation device 3, a housing 4, and an inflatable airbag 5 connected with housing 4. According to FIGS. 2 and 3, the inflation device 3 is formed by a tube generator 6, inserted, for example, from one end of the housing 4 through a corresponding opening into the housing 4 and abutting a bead 8 on the outside of the end wall (see FIG. 1).

Figure 3:
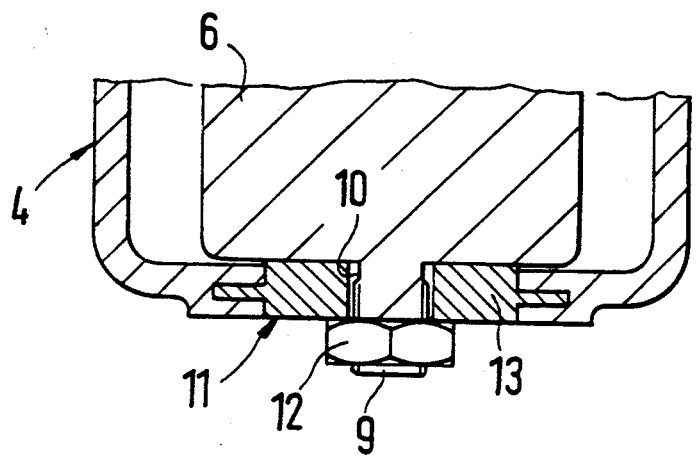
FIG. 3 is a section along line III—III in FIG. 2.
Figure 4:
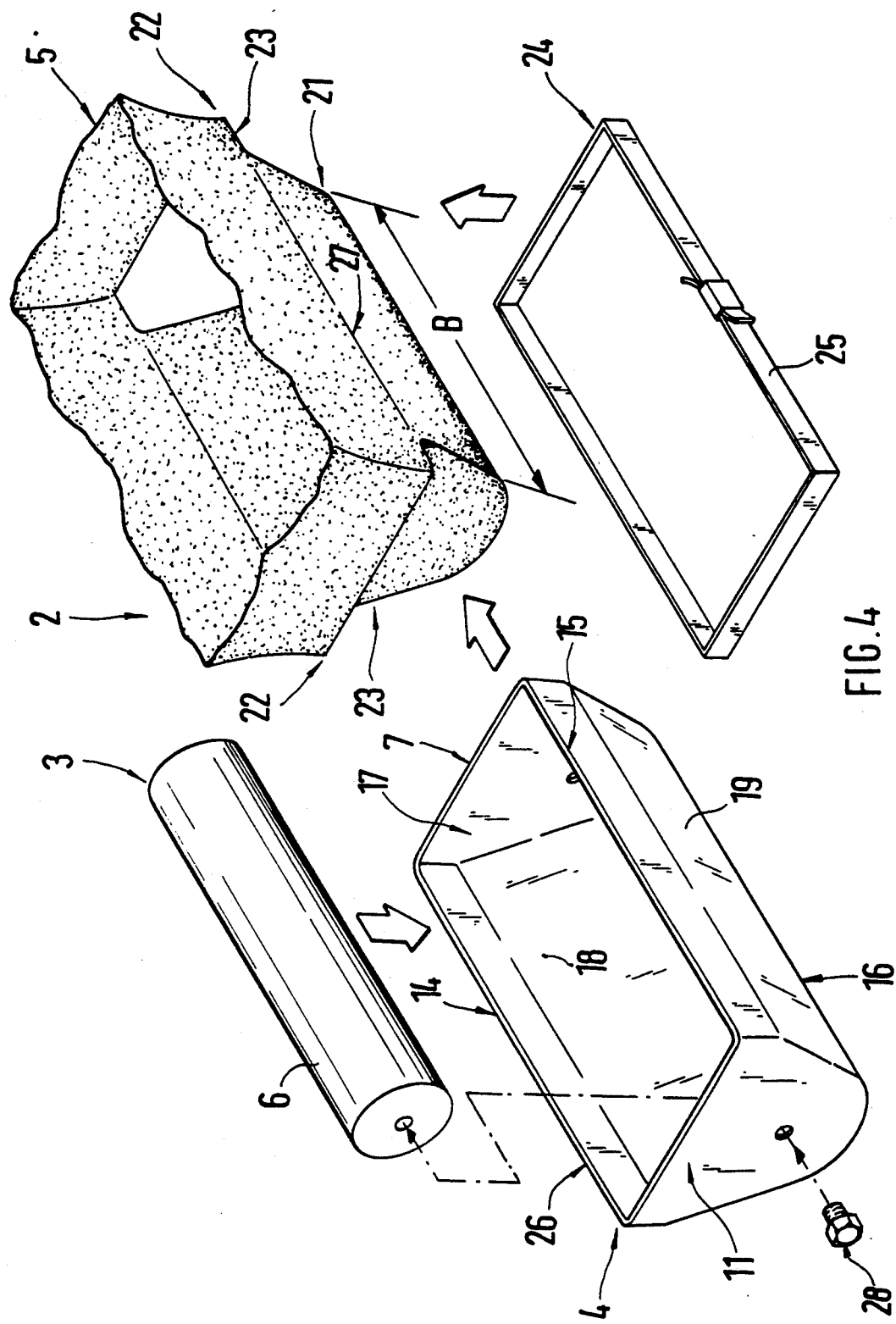
FIG. 4 is a perspective view of the housing, the inflation device, the airbag, and the tensioning element from the airbag according to an exemplary embodiment of the present invention.

The other end of the tube generator 6 has a projecting threaded stub 9 guided through a housing opening 10 in the other end wall 11 of the housing 4. A nut 12 is twisted externally onto the end area of the threaded stub 9 projecting out of the housing 4, said nut holding the tube generator 6 (FIG. 3). It is also possible, however, to insert the inflation device 3 into the housing 4 from above (FIG. 4). In this case, the inflation device 3 is connected to the housing 4 by screws 28.

Figure 2:
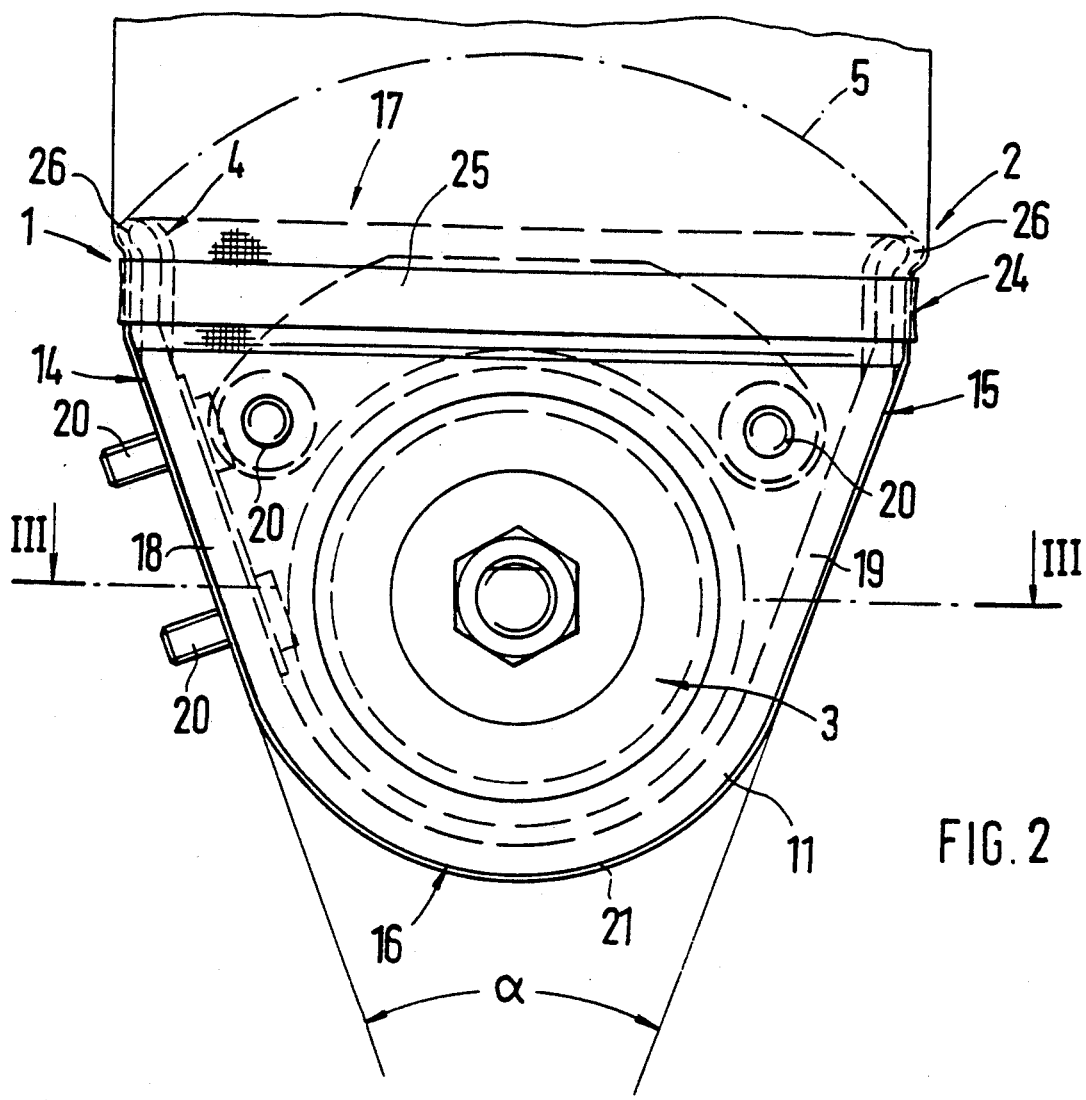
FIG. 2 is a view looking in the direction of arrow R in FIG. 1.

According to FIGS. 2 and 3, the trough-shaped housing 4 is open at the top and made of duroplastic plastic, with an insertion part 13 made of metal or ceramic being provided above the housing 4 in the vicinity of the threaded stub 9. The housing 4 can be made of steel or aluminum sheet, or as an aluminum pressure diecast part.

According to FIGS. 1 and 2, the trough-shaped housing 4 comprises two opposite side walls 14 and 15, a rounded bottom 16, and two end walls 7, 11, with the bottom 16 having an escape opening 17 located opposite thereto. The side walls 14 and 15 are aligned parallel to one another segmentwise, adjacent to the escape opening 17, and run approximately diagonally inward, forming an acute angel α (FIG. 2). The two sections 18 and 19 that run at an angle are connected together by the rounded bottom 16.

Projecting threaded bolts 20 for fastening the housing 4 to the car body are provided either on the two end walls 7 and 11 or on one of the diagonal sections 18 and 19. The threaded bolts 20 can be inserted into a housing tool, so that they are integrated into the housing 4.

Simple and inexpensive fastening of the airbag 5 into the housing is ensured by having the airbag 5 abut the outside of the housing 4 using at least one suspender-like section 21 (FIG. 2). The suspender-like section 21 extends over at least a partial area (B) of the transverse extent of the housing 4. Advantageous power transmission is achieved when the suspender-like section 21 extends over a significant portion of the transverse section or over the entire transverse section of the housing 4.

The suspender-like section 21 is brought around both of the opposite side walls 14 and 15 and the rounded bottom 16 of the housing 4 and fits positively against the outside of the housing 4. According to FIG. 2, the suspender-like section 21 can either be made integral with the airbag 5 or can be formed by a separate part that is subsequently firmly attached to airbag 5. Especially simple installation of the airbag 5 is provided when at least one laterally external area 22 of the suspender-like section 21 has a recess 23, since lateral sliding of the airbag 5 over the housing 4 is possible as a result.

In FIGS. 1 and 4, the suspender-like section 21 is provided on each of the two outer sides 22 with a recess 23. Each recess 23 covers a significant portion of the end face 7 and/or the end face 11 as well as narrow circumferential strips in the vicinity of the molded threaded stub 20 for fastening the housing. A seal formed by a circumferential tensioning element 24 is provided between the airbag 5 and the internal housing 4 adjacent to the escape opening 17. The tensioning element 24 is formed by a compressible, lockable tensioning strip 25 resembling a hose clamp, which is protected against sliding heightwise. It is also possible to design the tensioning element 24 as a tensioning frame, with this shaped tensioning frame exerting an additional reinforcing function for the housing 4.

According to FIG. 2, the tensioning strip 25 extends in the vicinity of the sections of the two side walls 14 and 15 that run parallel to one another. To hold the tensioning element 24 in position heightwise, outwardly directed beads 26 are provided on the housing 4 above tensioning element 24, and outwardly directed bead-shaped elements 27 are provided below the tensioning element 24, at least along the side walls 14 and 15 on the airbag 5. The bead-shaped elements 27 can be made as inserts, a seam, or transverse thickening. The folded section of the inflatable airbag 5 (not shown) extends above escape opening 17 of housing 4 as a continuation of the suspender-like section 21.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Restraining device for motor vehicle occupants, comprising:
   a housing, having a bottom, two opposing side walls, two opposing end portions, and an open top portion opposite to the bottom;
   an inflation device located within the housing;
   an inflatable airbag connected to the housing, said airbag being in fluid communication with the inflation device; and
   at least one suspender-like section, attached to the airbag and having at least one opening corresponding to one of said end portions said housing, which abuts the airbag to the outside of the housing.

2. Restraining device according to claim 1, wherein the suspender-like section is guided around the opposing side walls and the bottom of the housing.

3. Restraining device according to claim 2, wherein the suspending-like section is integral with the airbag.

4. Restraining device according to claim 3, wherein the suspender-like section extends over at least a partial area of the width of the housing.

5. Restraining device according to claim 1, wherein the suspender-like section is guided over the housing from the side through the at least one opening.

6. Restraining device according to claim 1, wherein said at least one opening further exposes a portion of at least one of said side walls adjacent at least one of said end portions.

7. Restraining device according to claim 1, wherein the suspender-like section has an upper area where the airbag is attached thereto and further comprising a tensioning element that connects the airbag with the housing in the upper area of the suspender-like section in a gas-tight manner.

8. Restraining device according to claim 7, wherein the tensioning element is a compressible lockable tensioning strip surrounding the housing in a ring manner.

9. Restraining device according to claim 8, further comprising outwardly directed bead-like elements near the open top portion of the housing that hold the tensioning element in place.

10. Restraining device according to claim 7, wherein outwardly directed bead-like elements near the open top portion of the housing are provided to hold the tensioning element in place.

11. Restraining device according to claim 1, wherein the suspender-like section is integral with the airbag.

12. Restraining device according to claim 1, wherein the suspender-like section extends over at least a partial area of the width of the housing.

* * * * *